United States Patent Office 2,761,789
Patented Sept. 4, 1956

2,761,789

PRINTING PASTE FOR TEXTILES

Arthur Locher, Binningen, near Basel, and Arnold Dürst, Basel, Switzerland, assignors to Sandoz A. G., Basel, Switzerland, a Swiss firm No Drawing. Application April 29, 1954,
Serial No. 426,548

Claims priority, application Switzerland April 30, 1953

6 Claims. (Cl. 106—193)

The object of this invention is a printing paste for textile materials.

A number of processes are known for applying pigment dyestuffs to fibers with the aid of cellulose esters (for example, acetylcellulose, nitrocellulose). Printing with the aid of acetylcellulose solutions has been introduced into practice as the "Sericose process" (cf. for example volume 3 of "Die neuesten Fortschritte in der Anwendung der Farbstoffe" by Louis Diserens, 2nd edition, Basel, 1949). The present invention involves an improvement of the "Sericose process."

According to this invention, more vivid and, particularly, stronger printing effects are obtained by employing— for printing textile materials, leather, synthetic materials and the like according to the "Sericose process"—pigment dyestuffs which are insoluble or difficultly soluble in the usual organic solvents, in the form of preparations obtained by intimately kneading or rolling the pigment dyestuffs with cellulose esters, preferably acetylcelluloses with an acetic acid content of 45–60% by weight, in the presence of solvents for the cellulose esters as well as—in some cases, and especially during kneading—of solid water-soluble inorganic compounds, and thereafter drying the pastes (if desired, after discharging into water, filtering and washing).

Textile articles which may be printed according to the present invention include those of fibers of natural origin, such for example as cotton, jute, hemp, flax, straw, wool and silk, and also artificial fibers and fabrics such e. g. as those of regenerated cellulose, cellulose esters and wholly synthesized fibrous materials. The latter comprise inter alia polyamide fibers, polyester fibers, polyvinyl chloride fibers, polyacrylonitrile fibers, polystyrene fibers, mixed polymers on a basis of vinyl chloride, mixed polymers on a basis of acrylonitrile, etc. The invention is also excellently suited to the printing of mixed fibers of the last-enumerated fibers, such as frequently found on the market; mixed fabrics of this type have, as is known, heretofore presented special difficulties in the course of finishing by means of dyeing or printing processes. Interesting effects can also be obtained, according to the present invention, on paper, glass fibers and fabrics, as well as on leather and on synthetic materials of all kinds, such for example as materials, articles and sheets of polyvinyl chloride.

All pigment dyestuffs can be used according to the present invention which satisfy the requirements of being insoluble or difficultly soluble in solvents for cellulose esters. Illustrative of such pigment dyestuffs are inter alia inorganic pigment dyestuffs, such as powdered metal, the naturally occurring mineral colors, synthetically produced mineral colors; carbon black, organic pigment dyestuffs such as azo dyestuffs, lake-forming dyes, insoluble complex metal compounds of azo dyestuffs, etc., in so far as they comply with the afore-indicated requirement of being insoluble or difficultly soluble in solvents for cellulose esters. Where maximum fastness requirements have to be satisfied, it is preferable to employ pigment dyestuffs of the anthraquinone, benzanthrone or phthalocyanine series. For matting effects, white pigments are employed, e. g. titanium dioxide, zinc oxide, zinc sulfide, barium sulfate, etc., alone or in combination with the previously enumerated pigment dyestuffs.

The finer the particle size of the pigments, the purer and stronger the prints obtained therewith. For the purposes of the present invention, it is preferred that the pigment particle size be between 0.5 to 2 microns. A still smaller particle size may be realized when pigments, the grains of which are not too hard, are kneaded together with solid water-soluble inorganic compounds. Particularly suitable inorganic compounds for this purpose are for example sodium chloride, sodium sulfate, potassium chloride, etc. Such kneading additaments are preferably used in a one- to six-fold quantity by weight, relative to the pigment.

Solvents for cellulose esters can be classified, according to Diserens, loc. cit., as "true solvents," which first bring about a swelling of the cellulose ester and then convert the latter into a homogeneous colloidal solution, and as "semi-solvents," which consist of two solvents which individually do not dissolve cellulose esters, but which in admixture (e. g. ethyl alcohol + benzene) become a solvent for the latter. Suitable "true solvents" for acetylcellulose, for the purposes of the present invention, comprise acetone, cyclohexanone, methylcyclohexanone, dioxane, benzyl alcohol, diacetone alcohol, glycol monomethylether, methyl formate, ethyl formate, propyl formate, butyl formate, amyl formate, cyclohexyl formate, methyl acetate, ethylacetate, glycol monoformate, glycol diacetate, methylglycol acetate, ethylglycol acetate, acetoacetic ester, butyrolactone, pyridine, etc. Interesting "semi-solvents" comprise—in addition to the aforementioned ethyl alcohol-benzene mixture—the mixture of methylene chloride and methyl alcohol (an 8:1 by weight ratio being most advantageous), the mixture of ethyl acetate and methyl or ethyl alcohol in the 5:1 ratio, and mixtures of methyl or ethyl propionate with methyl or ethyl alcohol in the 5:1 ratio.

The pigment dyestuff preparations are preferably used in the form of printing pastes which contain, per 1000 parts by weight of paste, 20 to 300 parts by weight of pigment dyestuff preparation, 500 to 950 parts by weight of organic solvent (for dissolving the cellulose ester contained in the pigment dyestuff preparation), and 0 to 500 parts by weight of diluent. The inclusion of a diluent in the preparation of the printing paste makes possible the quick production of a lump-free paste, and is also advantageous in printing on fibers, such e. g. as acetate silk, where there is a possibility of damage to the fiber by the action of the organic solvent. Suitable diluents comprise for example dispersing agents such as methyl alcohol, ethyl alcohol, propyl alcohol, butyl alcohol, benzene, toluene, xylenes, etc., and also softeners such for example as ethyl phthalate, diethyl phthalate, ethyl tartrate, tricresyl phosphate, etc. In many cases, the fastness properties are enhanced when, instead of a diluent, a cellulose ester—preferably acetyl-cellulose with an acetic acid content of 45–60%—is added. Printing pastes of this type therefore consist, per 1000 parts by weight, of for example 20 to 300 parts by weight of pigment dyestuff preparation, 0 to 150 parts by weight of cellulose ester, 500 to 950 parts by weight of organic solvent, and 0 to 500 parts by weight of diluent, the fraction of pigment dyestuff preparation being even higher where matt effects are to be realized. The viscosity of the printing paste has a determining effect on its usefulness. Unlimited amounts of cellulose ester can not be incorporated into the paste. Thus, depending upon the viscosity of the particular cellulose ester employed, the total quantity of cellulose ester is advantageously kept within the range of 50 to 150 parts by weight per 1000 parts by weight of printing paste.

The following examples illustrate presently preferred embodiments of the invention, and are intended to be only exemplary and not limitative of the latter. In said examples, the parts are by weight and the temperatures are in degrees centigrade.

Example 1

60 parts of acetylcellulose with an acetic acid content of about 55% are subjected to swelling with 130 parts of acetone. The mixture is then kneaded together with 60 parts of hexadecachloro-copper-phthalocyanine and 240 parts of anhydrous sodium sulfate in a kneading apparatus until a pigment particle size smaller than two microns is achieved. The resultant paste is further kneaded with 250 parts of water until the acetylcellulose is precipitated with formation of a coarse granular pulp. The pulp is then stirred with an additional 2000 parts of water, the resultant suspension filtered, the filter residue washed free of acetone and salt, and then dried.

The so-obtained pigment dyestuff preparation is stirred together with 60 parts of acetylcellulose, 300 parts of acetone, 400 parts of benzyl alcohol and 120 parts of ethyl alcohol until a lump-free printing paste is obtained. A cotton fabric is printed with the said printing paste, and the resultant print is dried. There is thus obtained a vivid green print which is distinguished by a high fastness to light. A similar result is obtained upon printing viscose rayon fabric, instead of cotton fabric, with the said printing paste.

By stirring the aforesaid pigment dyestuff preparation together with 600 parts of cyclohexanone and 280 parts of ethyl alcohol, a printing paste is obtained which yields, on acetate silk, vivid green prints of excellent fastness to light and to flue gases.

Polyvinyl chloride sheets can also be printed in full, vivid green shades by using for example a printing paste prepared from 100 parts of the pigment dyestuff preparation and 900 parts of cyclohexanone.

Example 2

60 parts of 1-(Bz-1'-benzathronyl)-amino-anthraquinone and 60 parts of acetylcellulose with an acetic acid content of 52% are worked up into a pigment dyestuff preparation after the manner described in Example 1.

Prints obtained on Perlon with this pigment dyestuff preparation, by printing with a paste prepared after the manner described in Example 1, paragraph 2, are violet red-brown and are characterized by high fastness to light and very good fastness to chlorine.

Similar results are obtained by printing on Orlon instead of on Perlon.

Example 3

75 parts of acetylcellulose with an acetic acid content of about 55% are subjected to swelling by means of 300 parts of diacetone alcohol. The mixture is kneaded together with 25 parts of copper phthalocyanine and 100 parts of anhydrous sodium sulfate in a kneading apparatus until a pigment particle size of less than two microns is achieved. The resultant paste is intimately stirred with 1000 to 1500 parts of acetone, and then, while stirring, poured into 6000 parts of water. The precipitate is filtered, washed with water until it is completely free of diacetone alcohol, acetone and sodium sulfate and then dried and ground.

The so-obtained pigment dyestuff preparation is stirred into 300 parts of acetone and 600 parts of benzyl alcohol. Wool fabric printed with this printing paste is, after drying, blue; the print possesses excellent fastness to light. Similar results are obtained when use is made of silk instead of wool.

Strong and light-fast effects are likewise obtained on leather.

Example 4

A mixture of 50 parts of carbolized 1-(Bz-1'-benzanthronyl)-amino-6,7-dichloroanthraquinone and 30 parts of acetylcellulose with an acetic acid content of about 52% are kneaded together with 200 parts of anhydrous sodium sulfate and 120 parts of ethylene glycol monomethylether. Thereupon the paste is diluted with an additional 1000 parts of ethylene glycol monomethylether, the so-obtained suspension stirred into 6000 parts of water, the resultant precipitate filtered, and the filter residue washed with water until complete removal of sodium sulfate and organic solvent is realized. After drying and grinding, a dyestuff-acetylcellulose mixture is obtained which is well suited for printing on Perlon, Orlon and Dynel with a printing paste prepared after the manner described in the second paragraph of Example 1. Red-brown prints of outstanding fastness to light are obtained.

Example 5

60 parts of 5-(anthraquinonyl-1')-amino-1,9-isothiazolanthrone and 15 parts of acetylcellulose with an acetic acid content of 52% are worked up into a pigment dyestuff preparation after the manner described in Example 4. An Acrilan fabric printed with a paste prepared as described in the second paragraph of Example 3 and then dried, has a level, light-fast red shade.

Example 6

50 parts of dibromindanthrene are worked up into a pigment dyestuff preparation with 33 parts of acetylcellulose having an acetic acid content of about 55%, after the manner described in Example 1. This preparation is stirred into a mixture of 50 parts of acetylcellulose, 400 parts of acetone, 200 parts of benzyl alcohol and 300 parts of ethyl alcohol. Dacron fabric printed with the thus-obtained printing paste has, after drying, a very level blue shade of excellent fastness to light.

Example 7

60 parts of the azo pigment dyestuff obtained by coupling diazotized 1-amino-2-methyl-4-chlorobenzene with 2-hydroxynaphthalene-3-carboxylic acid phenylamide, 80 parts of acetylcellulose with an acetic acid content of about 55% and 300 parts of methylglycol acetate are worked up to a pigment dyestuff preparation after the manner set forth in Example 3. A printing paste, obtained from the said preparation after the manner described in paragraph 2 of Example 1, yields, on Terylene fabric, full red shades which are fast to wet treatments.

Example 8

A pigment dyestuff preparation obtained, after the manner described in Example 1, from 50 parts of N-monobenzoyl - 1,4 - diamino - 2 - methoxyanthraquinone, is stirred into a mixture of 25 parts of acetylcellulose, 250 parts of acetone, 450 parts of cyclohexanone and 200 parts of ethyl alcohol. The thinly-fluid printing paste is printed onto a mixed fabric of acetate silk and nylon by a screen printing process. After drying, there is obtained a level, vivid red-violet print of excellent fastness to light.

In like manner, similar excellent prints can be obtained on other mixed fabrics, for example, mixed fabrics from viscose and silk, nylon or Perlon and wool, acetate silk and cotton, Dynel and Acrilan, Orlon and Terylene, etc.

Example 9

A mixture of 60 parts of the azo pigment dyestuff obtainable by coupling diazotized 1-amino-2-methyl-4-nitrobenzene with 2-hydroxynaphthalene-3-carboxylic acid-(4'-methoxy)-phenylamide, and 60 parts of acetylcellulose with an acetic acid content of about 52% are kneaded together with about 240 parts of ethylene glycol monomethylether until a pigment particle size of less than two microns is achieved. The thus-produced paste is thereupon diluted with ethylene glycol monomethylether and the obtained suspension is dried in an atomization dryer. Printing pastes prepared with this pigment dyestuff preparation yield red prints.

Valuable red prints are also obtained with a pigment dyestuff preparation made from the calcium lake of the azo dyestuff obtained by coupling diazotized 1-amino-2-methyl-4-chlorobenzene with 2-hydroxynaphthalene-3-carboxylic acid.

*Example 10*

100 parts of titanium dioxide and 120 parts of acetylcellulose with an acetic acid content of 50–55% are pastified and intimately admixed with 2000 parts of acetone. The resultant mixture is thoroughly ground in a ball mill and then diluted with an additional 1600 parts of acetone. The so-obtained suspension is poured, while stirring thoroughly, into 16,000 parts of water at about 70–80°, after which the resultant precipitate is filtered, washed free from acetone, and dried.

After further grinding, a pigment dyestuff preparation is obtained which, stirred with 600 parts of cyclohexane and 180 parts of ethyl alcohol to form a printing paste, yields valuable matting effects on acetate silk.

Bronzy effects are obtained if, while otherwise proceeding according to the foregoing two paragraphs, the titanium dioxide is replaced by a powdered metal, for example aluminum powder. By replacing the titanium dioxide with carbon black, for example gas black, black prints are obtained which are fast to washing and to water.

Having thus disclosed the invention what is claimed is:

1. A printing paste for textile materials and the like, comprising an intermediate consisting essentially of an intimate admixture of pigment dyestuff and acetylcellulose with an acetic acid content of 45–60%, said printing paste also comprising an organic solvent for cellulose ester, and a diluent, the said dyestuff being difficultly soluble to insoluble in said organic solvent.

2. A printing paste for textile materials and the like, comprising an intermediate consisting essentially of an intimate mixture of hexadecachloro-copper-phthalocyanine and acetylcellulose with an acetic acid content of about 55%, said printing paste also comprising acetone and benzyl alcohol as organic solvents for acetylcellulose, and ethyl alcohol as a diluent.

3. A printing paste for textile materials and the like, comprising an intermediate consisting essentially of an intimate mixture of 1-(Bz-1'-benzanthronyl)-amino-anthraquinone and acetylcellulose with an acetic acid content of about 52%, said printing paste also comprising acetone and benzyl alcohol as organic solvents for acetylcellulose, and ethyl alcohol as a diluent.

4. A printing paste for textile materials and the like, comprising an intermediate consisting essentially of an intimate mixture of dibromindanthrene and acetylcellulose with an acetic acid content of about 55%, said printing paste also comprising acetone and benzyl alcohol as organic solvents for acetylcellulose, and ethyl alcohol as a diluent.

5. A printing paste for textile materials and the like, comprising an intermediate consisting essentially of an intimate mixture of the monoazo dyestuff from diazotized 1-amino-2-methyl-4-chlorobenzene and 2-hydroxynaphthalene-3-carboxylic acid phenylamide and acetylcellulose with an acetic acid content of about 55%, said printing paste also comprising acetone and benzyl alcohol as organic solvents for acetylcellulose, and benzyl alcohol as a diluent.

6. A printing paste for textile materials and the like, comprising an intermediate consisting essentially of an intimate mixture of titanium dioxide and acetylcellulose with an acetic acid content of about 55%, said printing paste also comprising cyclohexane as an organic solvent for acetylcellulose, and ethyl alcohol as a diluent.

References Cited in the file of this patent

UNITED STATES PATENTS

| | | |
|---|---|---|
| 1,345,354 | Doerflinger | July 6, 1920 |
| 1,394,890 | Gault | Oct. 25, 1921 |
| 1,775,179 | Weidig | Sept. 9, 1930 |
| 1,800,299 | Kranzlein et al. | Apr. 14, 1931 |
| 1,880,502 | Shannon | Oct. 4, 1932 |
| 1,892,871 | Crowell | Jan. 3, 1933 |